106. COMPOSITIONS, COATING OR PLASTIC

SUBSTITUTED FOR MISSING COPY.

EXAMINER 64,433

United States Patent Office.

ROBERT O. LOWREY, OF SARATOGA SPRINGS, NEW YORK.

Letters Patent No. 64,433, dated May 7, 1867.

IMPROVED FOUNDATION FOR ROOFS.

*The Schedule referred to in these Letters Patent and making part of the same.*

TO ALL WHOM IT MAY CONCERN:

Be it known that I, ROBERT O. LOWREY, of Saratoga Springs, in the county of Saratoga, and State of New York, have invented certain new and useful improvements in Plastic Foundation for Cement Roofs; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in preparing a foundation for cement roofing, which can be applied in a plastic form, and which is intended to be used in a similar manner to that described in my application for a patent recently filed. In some instances it is desirable to have the foundation, on which the cement is to be spread, made of materials which will set or harden sufficiently to permit the cement to be spread thereon very soon after the foundation is prepared. This is especially the case where it is necessary, in repairing roofs, to cover or renew portions only of the roof, as in such cases the delay necessary for the hardening or drying of the clay and sand foundation, or of a foundation composed of common mortar applied in a plastic condition, will endanger the injuring of the building or its contents by rain storms, &c.

To obviate these difficulties, I construct my foundation, in such cases, of a mortar composed of hydraulic cement and sand prepared in the usual manner, and spread, while in a plastic condition, on the roof-boards or strips, as described in my former application. Instead of sand, ground stone, slate, cinders, marble-dust, or any equivalent material, may be substituted, the result and operation being the same. In cases where it is not necessary to hasten the operation, and where, for that reason, the use of hydraulic cement is not required, I make the foundation of clay made into a mortar, and spread as before described, or of a mixture of clay, lime, and sand, prepared and applied in a similar manner.

Various other ingredients may also be used in preparing the plastic foundation, such as coal-dust, ground stone, or slate, brick-dust, cinders, ashes, or any other similar substance which can be incorporated with the lime, clay, or marl, and made into a mortar, so as to be applied, in a plastic form, as a foundation to receive and hold the cement. These ingredients may be used singly with the lime, clay, or marl, or they may be combined in any desired manner to form the plastic compound for the foundation, the object being to form a cheap and simple compound that can be applied, in a plastic form, as a foundation for receiving the cement, and to be used instead of the tarred paper, or roofing-felt, or cloth heretofore in use for that purpose.

In preparing the foundation, those ingredients will be used which are most accessible and convenient, and which can be obtained at least expense; and these, of course, will vary in different localities and at different times. When the foundation has been thus prepared and applied, it is then to be covered with the water-proof cement described in my application hereinbefore referred to, or any other suitable material. In this way I provide a foundation for roofs that can be readily and cheaply prepared and applied, in town or country, and that can be prepared and applied by any ordinary laborer.

Having thus described my invention, what I claim, is—

A plastic foundation for roofing cement, prepared and applied substantially as herein described.

ROBERT O. LOWREY.

Witnesses:
W. C. DODGE,
P. T. DODGE.